(12) United States Patent
Nishio et al.

(10) Patent No.: US 9,828,947 B2
(45) Date of Patent: Nov. 28, 2017

(54) FUEL GAS SUPPLY METHOD AND SUPPLY UNIT FOR GAS ENGINE

(75) Inventors: Hideki Nishio, Tokyo (JP); Hajime Suzuki, Tokyo (JP); Yuuichi Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 739 days.

(21) Appl. No.: 13/881,210

(22) PCT Filed: Aug. 22, 2011

(86) PCT No.: PCT/JP2011/068860
§ 371 (c)(1),
(2), (4) Date: Apr. 24, 2013

(87) PCT Pub. No.: WO2012/105076
PCT Pub. Date: Aug. 9, 2012

(65) Prior Publication Data
US 2013/0220278 A1    Aug. 29, 2013

(30) Foreign Application Priority Data
Jan. 31, 2011    (JP) .................................. 2011-018439

(51) Int. Cl.
*F02D 41/30* (2006.01)
*F02M 21/02* (2006.01)
(Continued)

(52) U.S. Cl.
CPC ........ *F02M 21/0284* (2013.01); *F02D 19/023* (2013.01); *F02D 19/0642* (2013.01);
(Continued)

(58) Field of Classification Search
CPC ..... F02D 41/30; F02D 41/3094; F02M 21/04; F02M 21/0218; F02M 21/023;
(Continued)

(56) References Cited

U.S. PATENT DOCUMENTS 5,263,461 A * 11/1993 Fujimoto ........... F02M 25/0809
123/198 D
5,622,053 A *  4/1997 Freen ..................... F02B 33/44
123/299
(Continued)

FOREIGN PATENT DOCUMENTS

CN         1831318 A      9/2006
CN       101680377 A      3/2010
(Continued)

OTHER PUBLICATIONS

Notice of Allowance dated Apr. 30, 2014 in corresponding Korean Application No. 10-2013-7011044 (with English translation.
(Continued)

*Primary Examiner* — Sizo Vilakazi
*Assistant Examiner* — Kevin R Steckbauer
(74) *Attorney, Agent, or Firm* — Wenderoth, Lind & Ponack, L.L.P.

(57) ABSTRACT

In a gas engine provided with a gas supply pipe (35) branching into a supercharger-side gas supply pipe (33) and a cylinder-side gas supply pipe (37), a supercharger-side gas adjusting valve (43) and a cylinder-side gas adjusting valve (45) for controlling flow rates of passages, when the gas concentration of the fuel gas changes, the cylinder-side gas adjusting valve is controlled first to keep the output of the gas engine constant and then the supercharger-side gas adjusting valve is controlled to achieve the fuel gas flow rate Q1 based on the constant flow ratio by means of a gas supply controller (63), while maintaining the flow rate ratio Q1/Q2 at a constant value where Q1 is a fuel gas flow rate in the supercharger-side gas supply pipe and Q2 is a fuel gas flow rate in the cylinder-side gas supply pipe.

11 Claims, 5 Drawing Sheets

(51) Int. Cl.
*F02D 19/06* (2006.01)
*F02M 21/04* (2006.01)
*F02D 19/02* (2006.01)
*F02D 41/00* (2006.01)

(52) U.S. Cl.
CPC ..... *F02D 19/0647* (2013.01); *F02D 41/0027* (2013.01); *F02D 41/30* (2013.01); *F02M 21/0215* (2013.01); *F02M 21/04* (2013.01); *F02D 41/3094* (2013.01); *F02M 21/023* (2013.01); *F02M 21/0218* (2013.01); *F02M 21/0245* (2013.01); *F02M 21/0248* (2013.01); *Y02T 10/32* (2013.01)

(58) Field of Classification Search
CPC .......... F02M 21/0233; F02M 21/0239; F02M 21/0245; F02M 21/0248; F02M 21/0278; F02M 21/284; Y02T 10/32
USPC ................. 123/478, 482, 515, 530; 322/40
See application file for complete search history.

(56) References Cited

U.S. PATENT DOCUMENTS

| | | | | |
|---|---|---|---|---|
| 7,228,849 | B1* | 6/2007 | Preston | F02M 37/0029 123/457 |
| 8,347,861 | B2* | 1/2013 | Shimizu | F02D 23/00 123/445 |
| 8,485,158 | B2* | 7/2013 | Nishio | F02M 21/047 123/445 |
| 8,973,361 | B2* | 3/2015 | Shimizu | F01D 11/04 123/559.1 |
| 9,086,022 | B2* | 7/2015 | Shimizu | F02B 19/1004 |
| 9,217,398 | B2* | 12/2015 | Nishio | F02M 33/04 |
| 9,267,425 | B2* | 2/2016 | Suzuki | F02M 31/13 |
| 2007/0074702 | A1 | 4/2007 | Nakamura et al. | |
| 2007/0119422 | A1 | 5/2007 | Lewis et al. | |
| 2008/0092628 | A1* | 4/2008 | Oishi | G01N 27/16 73/25.01 |
| 2010/0126170 | A1* | 5/2010 | Nishio | F02D 19/027 60/611 |
| 2010/0264885 | A1* | 10/2010 | Olsen | F16H 61/444 322/40 |
| 2010/0275891 | A1 | 11/2010 | Gruber | |
| 2011/0247589 | A1* | 10/2011 | Shimizu | F02D 23/00 123/445 |
| 2013/0055712 | A1* | 3/2013 | Shimizu | F02B 19/1004 60/602 |
| 2013/0067913 | A1* | 3/2013 | Nishio | F02M 33/04 60/599 |
| 2013/0101401 | A1* | 4/2013 | Shimizu | F01D 11/04 415/175 |
| 2013/0220278 | A1* | 8/2013 | Nishio | F02M 21/04 123/478 |
| 2014/0000255 | A1* | 1/2014 | Suzuki | F02D 9/02 60/599 |

FOREIGN PATENT DOCUMENTS

| | | |
|---|---|---|
| CN | 101680397 A | 3/2010 |
| DE | 10 2004 043 934 | 3/2006 |
| EP | 1 437 496 A2 | 7/2004 |
| JP | 2001-132550 | 5/2001 |
| JP | 2001132550 A * | 5/2001 |
| JP | 2003-278605 | 10/2003 |
| JP | 2004-211674 | 7/2004 |
| JP | 2004-293300 | 10/2004 |
| JP | 2005-54613 | 3/2005 |
| JP | 2006-9603 | 1/2006 |
| JP | 2006-249954 | 9/2006 |
| JP | 2006249954 A * 9/2006 | ............. F02M 21/04 |
| JP | 2007-92724 | 4/2007 |
| JP | 2007-154883 | 6/2007 |
| JP | 2008-248828 | 10/2008 |
| JP | 2009-62936 | 3/2009 |
| JP | WO 2009078259 A1 * 6/2009 | ............. F02D 23/00 |
| JP | 2009-144626 | 7/2009 |

OTHER PUBLICATIONS

International Search Report dated Nov. 1, 2011 in corresponding International Application No. PCT/JP2011/068860.
Decision to Grant a Patent dated May 31, 2013 in corresponding Japanese Application No. 2011-018439 (with English translation).
Machine translation of Japanese Patent Application Publication No. 2001-132550, published May 15, 2001.
International Preliminary Report on Patentability and Written Opinion of the International Searching Authority dated Aug. 6, 2013 in corresponding International Application No. PCT/JP2011/068860 (with English translation).
Notice of Allowance dated Jul. 23, 2015 in corresponding Chinese patent application No. 201180050750.4 (with English translation).
Office Action dated Jan. 6, 2015 in corresponding Chinese Application No. 201180050750.4 (with English translation).
Extended European Search Report dated Jul. 21, 2017 in corresponding European Application No. 11857666.9.

* cited by examiner

FUEL GAS SUPPLY METHOD AND SUPPLY UNIT FOR GAS ENGINE

BACKGROUND OF THE INVENTION

1. Technical Field

The present invention relates to a fuel gas supply method and a fuel gas supply unit for a gas engine which combusts mixture gas supplied into a combustion chamber, the mixture gas being formed by fuel gas supplied through a fuel gas passage and the air.

2. Description of the Related Art

A conventional gas engine, particularly a small gas engine, usually adopts a fuel-gas mixing system in which fuel gas and air are mixed upstream of a supercharger and then supplied to a combustion chamber.

In the case of supplying the mixture gas by this fuel-gas mixing system, gas concentration in a supply air chamber changes as well as calorific value of the fuel gas and thus, depending on the gas concentration in the supply air chamber, it may cause abnormal combustion such as self ignition and the safety inside the supply air chamber inevitably relies on calorie of fuel gas.

In most of conventional larger gas engines, it is necessary to supply an equal amount of the fuel gas to the cylinders as well as an equal mixture ratio of the air to the fuel gas (an air-fuel ratio) and thus, fuel gas adjusting valves are provided just before each of the cylinders so as to supply the fuel gas to the combustion chamber. By adopting this system, the air fuel ratio and the gas input amount are equalized to be supplied evenly to the cylinders and hence work performed in each of the cylinders is more efficient. Further, since the fuel gas and the air are mixed just before each cylinder, a flammable region in the mixture gas supply passage can be shorter and hence operation safety can be improved.

JP 2001-132550A describes one technique combining above-mentioned two systems. In this technique, two supply units are provided, one for supplying fuel gas to a supply air passage located upstream of the supercharger before pressurizing the fuel gas by a gas compressor and the other for injecting the fuel gas pressurized by the gas compressor into the supply air passage or the cylinder. The supply unit located upstream of the supercharger in the supply air passage is configured so that its operational state is changeable between a supply state and a stopped state.

However, in the technique described in JP 2001-132550A, the fuel gas supply system in which the fuel gas compressed by the gas compressor is supplied to the cylinders, requires compression of the fuel gas to a pressure higher than a pressure of the supercharged air, whereas in the case of using low calorific gas (gas having low calorific value) such as coal methane gas, a large gas compressor having large capacity is needed to compress a large flow of gas at a low pressure. Further, in the supply system in which the fuel gas is supplied to the supply air passage upstream of the supercharger, the gas concentration of the fuel gas in the supply air passage might exceed a lower flammable limit, which generates potential risks of abnormal combustion such as self ignition.

Therefore, in JP 2006-249954A, a gas supply device of the gas engine is configured so that one part of fuel gas is mixed with air at an inlet of the supercharger and this air-fuel mixture is supplied into the supercharger, while the other part of the fuel gas is mixed with supply air in the supply air passage of each cylinder and this air-fuel mixture is supplied into each cylinder of the engine. The gas supply device is provided with: a supercharger-side adjusting valve for adjusting flow rate of gas in a supercharger-side gas supply passage; a cylinder-side adjusting valve for adjusting flow rate of gas in each cylinder-side gas supply passage; and a gas amount controller for controlling opening of the supercharger-side adjusting valve and adjusting the flow rate of fuel gas into the supercharger-side gas supply passage to maintain gas concentration of the fuel gas in the air-fuel mixture supplied to the supercharger below the flammable lower limit.

According to this technique, the possibility of explosion of fuel gas at the outlet of the supercharger is completely eliminated and the power of the gas compressor for compressing the fuel gas supplied to the air passage of each cylinder is reduced even in the case of using low calorie gas (gas having low caloric value). Thus, it is possible to miniaturize a gas compressor and reduce its capacity.

Disclosed in JP 2009-144626A is a fuel gas supply structure which is similar to that of JP 2006-249954A.

SUMMARY OF THE INVENTION

1. Technical Problem

As described above, according to JP 2006-249954A and JP 2009-144626A, even in the case of using the low calorie gas, it is still possible to secure sufficient flow rate of the fuel gas and also to reduce the size and capacity of the gas compressor for compressing the fuel gas. Further, by adjusting the flow rate of fuel gas supplied to the supercharger-side gas supply passage so that the gas concentration of the fuel gas in the air-fuel mixture supplied to the supercharger is kept below the flammable lower limit, it is possible to prevent the gas concentration of fuel gas in the supply air passage from exceeding the flammable lower limit that can cause abnormal combustion such as self ignition.

However, the control and structure for preventing abnormal combustion such as self ignition is not disclosed in detail. Further, it is desired to provide a control method with a simple structure without a concentration meter that directly measures the concentration of the fuel gas, so that no abnormal combustion of flammable fuel gas is caused in the supply air passage even in the case where calorie of fuel gas fluctuates.

Therefore, in view of the above issues, it is an object of the present invention to provide a fuel gas supply method and a fuel gas supply apparatus for a gas engine, which are capable of maintaining safety while preventing abnormal combustion such as self ignition of the fuel gas in the supply air passage including the outlet of the supercharger with a simple structure.

2. Solution to the Problem

To solve the above issues, the present invention provides a fuel gas supply method for a gas engine which comprises: a fuel gas passage for supplying fuel gas which has low calorie and which fluctuates, the fuel gas passage branching into a supercharger-side gas supply passage which is connected to a mixer arranged on an air inlet side of a supercharger and a cylinder-side gas supply passage which is connected to a supply air passage for supplying air to a cylinder and on which a gas compressor for compressing the fuel gas is disposed; a first fuel gas adjusting valve for controlling a flow rate of the fuel gas in the supercharger-side gas supply passage; and a second fuel gas adjusting valve for controlling a flow rate of the fuel gas in the cylinder-side gas supply passage. The method comprises the steps of:

maintaining a flow rate ratio Q1/Q2 at a constant value where Q1 is a fuel gas flow rate in the supercharger-side gas supply passage which is adjustable by the first fuel gas adjusting valve and Q2 is a fuel gas flow rate in the cylinder-side gas supply passage which is adjustable by the second fuel gas adjusting valve;

adjusting the fuel gas flow rate Q2, when gas concentration of the fuel gas changes, by adjusting the second fuel gas adjusting valve so as to keep output of the gas engine constant;

calculating the fuel gas flow rate Q1 based on the flow rate ratio Q1/Q2 and the adjusted fuel gas flow rate Q2; and adjusting the first fuel gas adjusting valve by the calculated fuel gas flow rate Q1.

According to the present invention, a relationship between the fuel gas flow rate Q1 in the supercharger-side gas supply passage and the fuel gas flow rate Q2 in the cylinder-side gas supply passage is set so that the flow rate ratio Q1/Q2 is kept at a constant value. When the gas concentration of the fuel gas changes, the fuel gas flow rate Q2 is adjusted first by adjusting the second fuel gas adjusting valve so as to keep output of the gas engine constant. Next, the fuel gas flow rate Q1 is calculated based on the flow rate ratio Q1/Q2 and the opening of the first fuel gas adjusting valve is adjusted by the calculated fuel gas flow rate Q1.

In this manner, the fuel gas flow rate Q1 in the supercharger-side gas supply passage and the fuel gas flow rate Q2 in the cylinder-side gas supply passage are adjusted to maintain the flow rate ratio Q1/Q2 at a constant value, and to keep the output of the gas engine constant, the second fuel gas adjusting valve is controlled first and next the flow rate ratio Q1 is controlled based on the flow rate ratio. As a result, it is possible to prevent the gas concentration of the fuel gas introduced from the supercharger-side gas supply passage from increasing to the level that causes abnormal combustion such as self ignition and explosion in the supply air pipe. This improves safety of the engine.

Further, in the present invention, by controlling the fuel gas flow rates Q1 and Q2 without installing a gas concentration meter, it is possible to prevent abnormal combustion such as self ignition, ignition and explosion in the supply air pipe, thereby achieving the safety. As a result, the control unit is simplified and the overall system can be lighter and more compact.

The low-calorie fuel gas whose calorie fluctuates is formed by a mixture of the air and methane such as Coal Mine Methane (CMM) and landfill gas (biogas). When the methane concentration changes, the output of the gas engine increases in response to an increase in the methane concentration, or the output of the gas engine declines in response to a decrease in the methane concentration.

Thus, to keep the output of the gas engine constant when the methane concentration changes, the fuel gas flow rate is reduced if the methane concentration increases, and the fuel gas flow rate is increased if the methane concentration declines.

Therefore, when increasing or decreasing the fuel gas flow rates, it is critical how the relationship is set between the fuel gas flow rate Q2 in the cylinder-side gas supply passage and the fuel gas flow rate Q1 introduced from the supercharger-side gas supply passage.

In the case where the fuel gas flow rate Q1 introduced from the supercharger-side gas supply passage is always kept constant, when the methane concentration of the fuel gas becomes higher, methane gas component introduced from the supercharger-side gas supply passage increases. This has a risk that the gas concentration of the fuel gas may reach the level that causes abnormal combustions such as self ignition, ignition and explosion in the supply air pipe.

However, in the present invention, the fuel gas flow rate Q1 in the supercharger-side gas supply passage and the fuel gas flow rate Q2 in the cylinder-side gas supply passage are controlled such that the flow rate ratio Q1/Q2 is set constant. Further, the fuel gas flow rate Q2 is adjusted first to keep the output of the gas engine constant by adjusting the second fuel gas adjusting valve.

Thus, when the methane concentration becomes higher, the fuel gas flow rate Q2 in the cylinder-side gas supply passage is reduced to achieve constant output and the fuel gas flow rate Q1 is also reduced according to the constant ratio. Thus, a risk of abnormal combustion is avoided, such as self ignition, ignition and explosion in the supply air pipe caused by increased methane components introduced from the supercharger-side gas supply passage.

More specifically, in the present invention, when the gas concentration of the fuel gas increases, the fuel gas flow rate Q2 may be reduced to keep the output of the gas engine constant and the fuel gas flow rate Q1 may be reduced based on the constant flow rate ratio Q1/Q2 so that a rise in the gas concentration of the fuel gas introduced to the supercharger after being mixed in the mixer is suppressed to maintain the gas concentration approximately at a constant value.

Further, the gas concentration, which is maintained approximately at the constant value, may be a prescribed value below a flammable lower limit of the fuel gas with respect to the air.

Further, when gas concentration of the fuel gas decreases, the fuel gas flow rate Q2 may be increased to keep the output of the gas engine constant and the fuel gas flow rate Q1 may be increased based on the constant flow rate ratio Q1/Q2 so that a decline in the gas concentration of the fuel gas introduced to the supercharger after being mixed in the mixer is suppressed to maintain the gas concentration approximately at a constant value.

As described above, when the gas concentration of the fuel gas decreases, the fuel gas flow rate Q2 is increased to keep the output of the gas engine constant and the fuel gas flow rate Q1 is also increased based on the constant flow rate ratio Q1/Q2. Therefore, it is possible to promptly make the output of the gas engine constant.

Furthermore, the gas engine may be an engine for electric power generation and may be configured to be driven so that electric power output of the gas engine is kept constant by keeping the output of the gas engine constant.

Moreover, the fuel gas may be coal mine methane having a low calorific value that easily fluctuates.

Further, a fuel gas supply apparatus for a gas engine, according to the present invention, comprises:

a fuel gas passage for supplying fuel gas which has low calorie and which fluctuates, the fuel gas passage branching into: a supercharger-side gas supply passage connected to a mixer arranged on an air inlet side of a supercharger; and a cylinder-side gas supply passage which is connected to a supply air passage for supplying air to an cylinder and on which a gas compressor for compressing the fuel gas is disposed, a first fuel gas adjusting valve for controlling a flow rate of the fuel gas in the supercharger-side gas supply passage;

a second fuel gas adjusting valve for controlling a flow rate of the fuel gas in the cylinder-side gas supply passage; and a gas supply controller for controlling an opening of the first fuel gas adjusting valve and an opening of the second fuel gas adjusting valve, wherein the gas supply controller comprises:

a flow rate ratio maintaining unit for maintaining a flow rate ratio Q1/Q2 at a constant value where Q1 is a fuel gas flow rate in the supercharger-side gas supply passage which is adjustable by the first fuel gas adjusting valve and Q2 is a fuel gas flow rate in the cylinder-side gas supply passage which is adjustable by the second fuel gas adjusting valve;

a second controller for controlling the second fuel adjusting valve, the second controller being configured to adjust the fuel gas flow rate Q2 by controlling the second fuel adjusting valve so as to keep output of the gas engine constant when gas concentration of the fuel gas changes; and a first controller for controlling the first fuel adjusting valve, the first controller being configured to calculate the fuel gas flow rate Q1 based on the flow rate ratio Q1/Q2 after the fuel gas flow rate Q2 is adjusted by the second controller and adjust an opening of the first fuel gas adjusting valve based on the calculated fuel gas flow rate Q1.

According to the present invention, a relationship between the fuel gas flow rate Q1 in the supercharger-side gas supply passage which is adjusted by the first fuel gas adjusting valve and the fuel gas flow rate Q2 in the cylinder-side gas supply passage which is adjusted by the second fuel gas adjusting valve is maintained at a constant value of the gas fuel ratio by the flow rate ratio maintaining unit. When the gas concentration of the fuel gas changes, the fuel gas flow rate Q2 is adjusted first by adjusting the second fuel gas adjusting valve by means of the second controller so as to keep the output of the gas engine constant. Next, the fuel gas flow rate Q1 is calculated based on the flow rate ratio Q1/Q2 and the opening of the first fuel gas adjusting valve is adjusted by the calculated fuel gas flow rate Q1 by means of the first controller.

In this manner, the fuel gas flow rate Q1 in the supercharger-side gas supply passage and the fuel gas flow rate Q2 in the cylinder-side gas supply passage are adjusted to maintain the flow rate ratio Q1/Q2 at a constant value, and to keep the output of the gas engine constant, the second fuel gas adjusting valve is controlled first and next the flow rate ratio Q1 is controlled based on the flow rate ratio. As a result, it is possible to prevent the gas concentration of the fuel gas introduced from the supercharger-side gas supply passage from increasing to the level that causes abnormal combustion such as self ignition and explosion in the supply air pipe. This improves safety of the engine.

3. Advantageous Effects

According to the above-described method and apparatus of the present invention, it is possible to achieve safety while preventing abnormal combustion such as self ignition of the fuel gas in the supply air passage including the outlet of the supercharger with a simple structure.

More specifically, the fuel gas flow rate Q1 in the supercharger-side gas supply passage and the fuel gas flow rate Q2 in the cylinder-side gas supply passage are adjusted to maintain the flow rate ratio Q1/Q2 at a constant value, and to keep the output of the gas engine constant, the second fuel gas adjusting valve is controlled first and next the flow rate ratio Q1 is controlled based on the flow rate ratio. As a result, it is possible to prevent the gas concentration of the fuel gas introduced from the supercharger-side gas supply passage from increasing to the level that causes abnormal combustion such as self ignition and explosion in the supply air pipe. This improves safety of the engine.

DETAILED DESCRIPTION OF THE INVENTION

Embodiments of the present invention will now be described in detail with reference to the accompanying drawings. It is intended, however, that unless particularly specified in these embodiments, dimensions, materials, shape, its relative positions and the like shall be interpreted as illustrative only and not limitative of the scope of the present invention.

Figure 1:
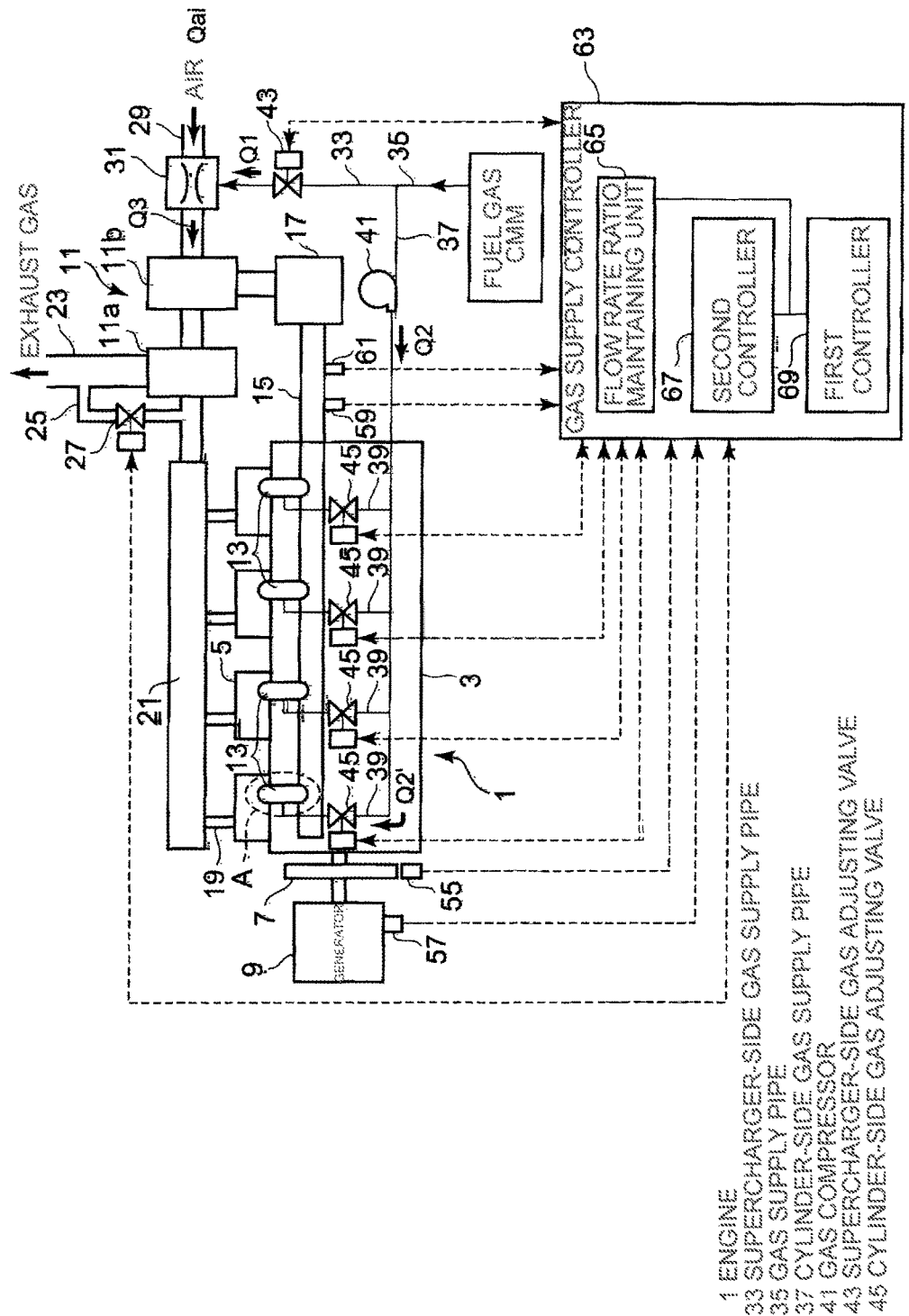
FIG. 1 is an illustration of an overall structure of a fuel gas supply unit of a gas engine according to an embodiment of the present invention.

In reference to FIG. 1, the overall structure of the fuel supply unit for the gas engine according to the present embodiment is described. In the drawing, an engine (a gas engine) 1 is formed by a cylinder block 3 and a cylinder head 5. Further, a generator 9 of direct drive is attached to the engine 1 via a flywheel 7.

Further, a supercharger 11 formed by an exhaust turbine 11a and a compressor 11b is provided. A supply air branch pipe 13 is connected to a supply inlet of each of the cylinder heads 5. A supply air pipe 15 connecting an outlet of the compressor 11b to each of the supply air branch pipes 13, and a supply air cooler 17 for cooling supply air flowing in the supply air pipe 15, are provided.

Each of exhaust pipes 19, connected to an exhaust outlet of each of the cylinder heads 5, is connected to an exhaust manifold 21 and the exhaust manifold 21 is connected to the exhaust turbine 11a. Further, an exhaust outlet pipe 23 is attached to an outlet of the exhaust turbine 11a to discharge exhaust gas from the outlet of the exhaust turbine 11a.

Furthermore, an exhaust bypass pipe 25 is provided. The exhaust bypass pipe 25 branches from an outlet side of the exhaust manifold 21 on an inlet side of the exhaust turbine 11a, so as to bypass the exhaust turbine 11a. The exhaust bypass pipe 25 is connected to the exhaust outlet pipe 23 on an outlet side of the exhaust turbine 11a. In the exhaust bypass pipe 25, an exhaust bypass valve 27 is provided to change a passage area of the exhaust bypass pipe 25.

A supercharger inlet air passage 29 is provided to introduce the air to the compressor 11b of the supercharger 11 from the outside. In the supercharger inlet air passage 29, a mixer 31 is provided. To the mixer 31, a supercharger-side gas supply pipe (a supercharger-side gas supply passage) 33 is connected.

A fuel gas tank (not shown) is provided to store the low-calorie fuel gas whose calorie fluctuates. The fuel gas is introduced from the fuel gas tank to a gas supply pipe (a fuel gas supply passage) 35. The gas supply pipe 35 branches into the supercharger-side gas supply pipe 33 and a cylinder-side gas supply pipe (a cylinder-side gas supply passage) 37. Further, the cylinder-side gas supply pipe 37 branches into a plurality of gas supply branch pipes 39. The plurality of gas supply branch pipes 39 are connected to the plurality of supply air branch pipes 13, respectively. Furthermore, a gas compressor 41 is provided in the cylinder-side gas supply pipe 37 to compress the fuel gas flowing in the cylinder-side gas supply pipe 37.

The low-calorie fuel gas whose calorie fluctuates includes Coal Mine Methane (CMM gas), landfill gas (biogas), etc. In the present embodiment, CMM is used as the fuel gas. Coal Mine Methane is formed of mixture of the air and methane. CMM contains methane produced during formation of coal beds and the methane bubbles up from coal beds and its periphery during coal extraction. Normally, CMM concentration fluctuates in the range of 15% to 50%.

In the supercharger-side gas supply pipe 33, a supercharger-side gas adjusting valve (a first fuel gas adjusting valve) 43 is provided to control a fuel gas flow rate Q1 to the supercharger inlet air passage 29. Further, in each of the gas supply branch pipes 39, a cylinder-side gas adjusting valve (a second fuel gas adjusting valve) 45 is provided to control a fuel gas flow rate Q2' in the each of the gas supply branch pipes 39. As a sum of the fuel gas flow rates Q2' of all of the cylinders, a fuel gas flow rate Q2 of the fuel gas supplied via the cylinder-side gas supply pipe 37 is controlled.

Figure 3:
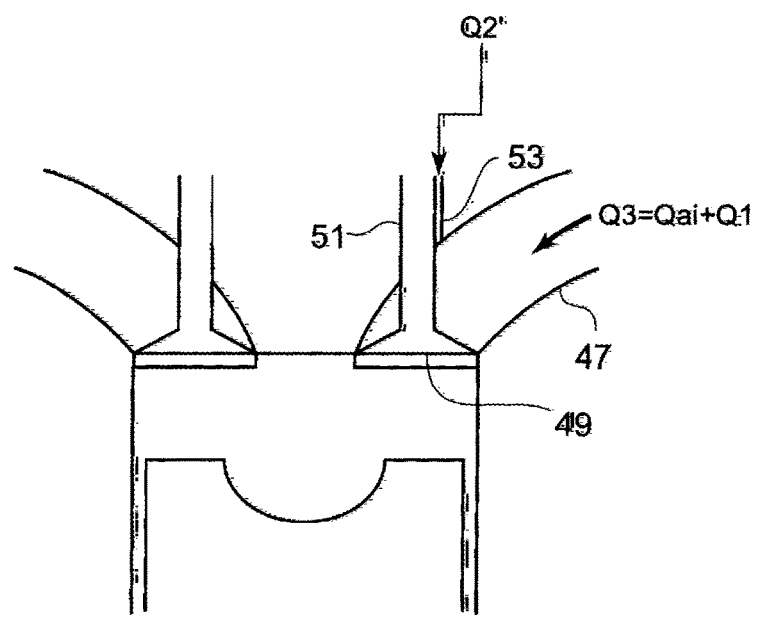
FIG. 3 is an explanatory view of an inflow state in which the fuel gas flows into an inflow port.

FIG. 3 is an explanatory view of an inflow state of the fuel gas in section A of the supply air branch pipe 13 illustrated in FIG. 1

To a supply air port 47 of FIG. 3, the fuel gas having been compressed in the supercharger 11 is supplied through the supply air branch pipe 13. This fuel gas in a total flow rate Q3 is supplied to the supply air port 47. The total flow rate Q3 is a mixture of a flow rate Qai of the air introduced to the mixer 31 through the supercharger inlet air passage 29 and the fuel gas flow rate Q1 introduced to the mixer 31 through the supercharger-side gas supply pipe 33.

Meanwhile, it is configured that the flow rate Q2' of the fuel gas flowing in each of the gas supply branch pipes 39 connected to each of the supply air branch pipes 13 is introduced to the supply air port 47 through paths such as a sliding part between a valve shaft 51 of a supply air valve 49 and the cylinder head 5, and a groove 53 formed in the sliding part.

A rotation speed sensor 55 for detecting a rotation speed of the engine, a load detector 57 for detecting a load of the generator 9, i.e. the engine load, a supply air pressure sensor 59 for detecting a pressure of the supply air in the supply air pipe 15, and a supply air temperature sensor 61 for detecting a temperature of the supply air in the supply air pipe 15 are provided. Further, signals from these sensors are inputted to a gas supply controller 63.

The gas supply controller 63 is provided with: a flow rate ratio maintaining unit 65 for maintaining a flow rate ratio Q1/Q2 at a constant value where Q1 is the fuel gas flow rate in the supercharger-side gas supply pipe 33 which is adjustable by the supercharger-side gas adjusting valve 43 and Q2 is the fuel gas flow rate in the cylinder-side gas supply pipe 37 which is adjustable by the cylinder-side gas adjusting valve 45; a second controller 67 for controlling the cylinder-side gas adjusting valve 45, the second controller 67 being configured to adjust the fuel gas flow rate Q2 by controlling the cylinder-side gas adjusting valve 45 so as to keep the output of the engine constant when gas concentration of the fuel gas changes; and a first controller 69 for controlling the supercharger-side gas adjusting valve 43, the first controller 69 being configured to calculate the fuel gas flow rate Q1 based on the flow rate ratio Q1/Q2 after the fuel gas flow rate Q2 is adjusted by the second controller 67 and adjust an opening of the supercharger-side gas adjusting valve 43 based on the calculated fuel gas flow rate Q1.

During operation of the engine, the fuel gas flows through the gas supply pipe 35 and then flows into two branched paths. One part of the fuel gas flowing into one branched path is introduced to the mixer 31 through the supercharger-side gas supply pipe 33 and then mixed in the mixer 31 with the air introduced from the supercharger inlet air passage 29. This mixture fuel gas is then introduced to the compressor 11b of the supercharger 11.

Then, this mixture fuel gas whose temperature and pressure is increased in the compressor 11b is supplied to a supply air cooler 17 to lower the temperature. The mixture fuel gas then enters the supply air branch pipe 13 of each of the cylinders through the supply air pipe 15.

The other part of the fuel oil flowing into the other branched path enters the cylinder-side gas supply pipe 37 and supplied to the gas compressor 41 to be compressed. The compressed fuel gas enters each of the supply air branch pipes 13 through each of the gas supply branch pipes 39 of each cylinder. As illustrated in FIG. 3, the fuel gas is mixed in the supply air port 47 with the mixture fuel gas flowing into the supply air branch pipe 13 of each of the cylinders through the supply air pipe 15 and then introduced to each of the cylinders.

Then, the fuel gas is combusted in each of the cylinders of the engine and is exhausted as exhaust gas. In the process, the exhaust gas from the cylinders flows into the exhaust manifold 21 through the exhaust pipes 19 and then is supplied to the exhaust turbine 11a of the supercharger 11 to drive the exhaust turbine 11a. Finally, the exhaust gas is exhausted to the outside through the exhaust outlet pipe 23.

Figure 4:
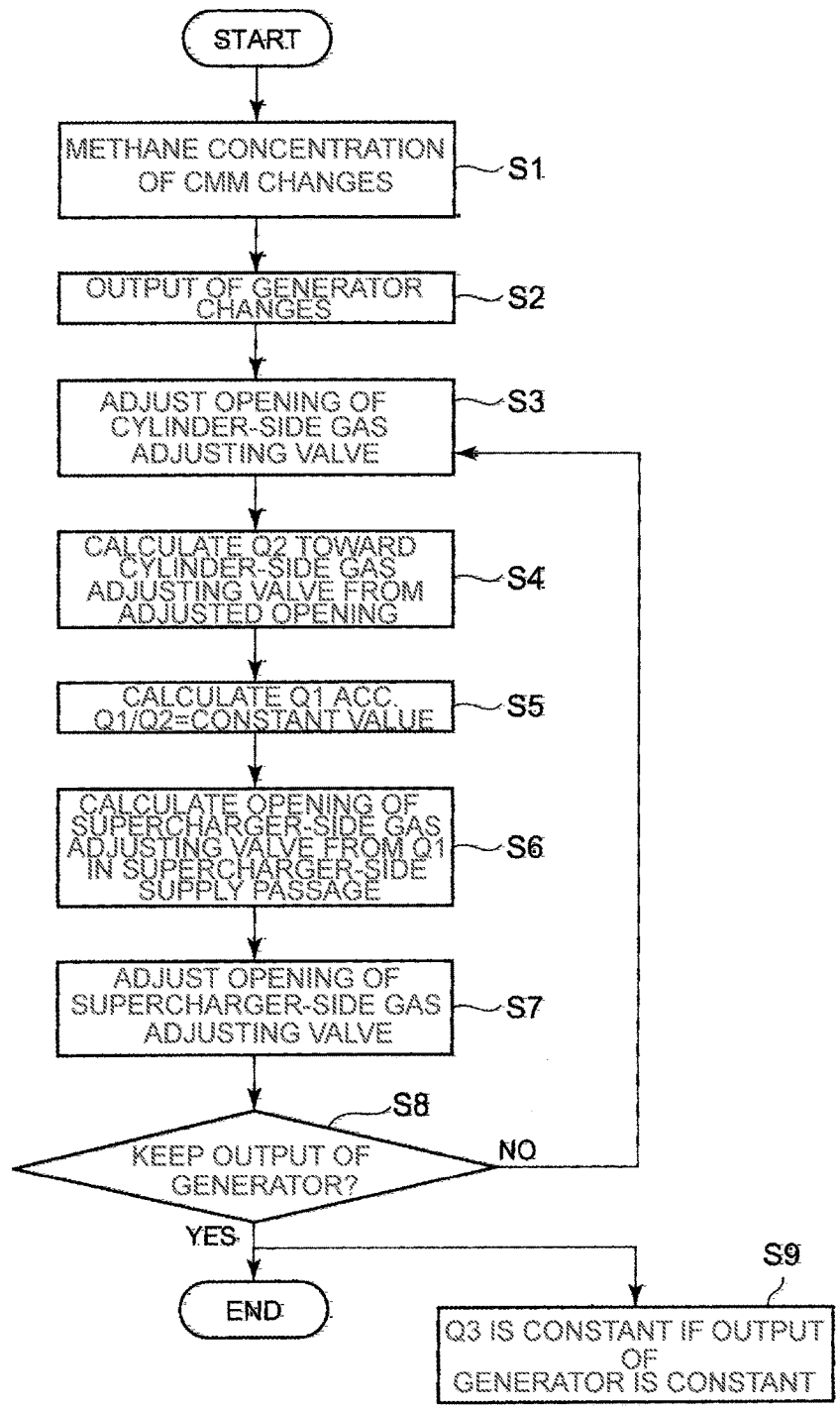
FIG. 4 is a control flow chart illustrating the control in a gas supply controller.

Described with reference to FIG. 4 is a control method used when the methane concentration of CMM constituting the fuel gas changes in the fuel gas supply unit of the gas engine having the above structure.

First, when the methane concentration of CMM changes in step S1, the heating calorific value of the fuel gas changes in step S2 and thus the output of the engine 1 changes. In response to this, the power output of the generator 9 changes. Its variation value is detected by the rotation speed sensor 55 or the load detector 57.

In step S3, the output of the engine 1 is adjusted with respect to the output change of the generator 9 so as to return to the state before the power output change of the generator 9. This adjustment is mainly performed by: step S3 of adjusting the fuel gas flow rate Q2 in the cylinder-side gas supply pipe 37 by means of the cylinder-side gas adjusting valve (second fuel gas adjusting valve) 45; and step S7 of adjusting the fuel gas flow rate Q1 in the supercharger-side gas supply pipe 33 by means of the supercharger-side gas adjusting valve 43.

In step S3, a normal electric governor function is performed and the opening of each of the cylinder-side gas adjusting valve 45 is controlled to achieve a target rotation speed which is set based on a detection value of the rotation speed of the engine detected by the rotation speed sensor 55 or to achieve an electric power output which is set based on a detection value of the load detected by the load detector 57.

More specifically, when the gas concentration of the fuel gas increases, the opening of each of the cylinder-side gas adjusting valves 45 is adjusted to reduce the fuel gas flow rate Q2 so as to keep the output of the gas engine constant, whereas, when the gas concentration of the fuel gas decreases, the opening of each of the cylinder-side gas adjusting valves 45 is adjusted to increase the fuel gas flow rate Q2 so as to keep the output of the gas engine constant.

Figure 2A:
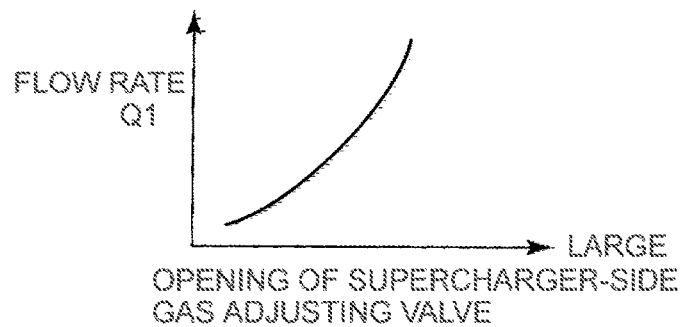
FIG. 2A is a chart illustrating an exemplary relationship between a flow rate and an opening of a first fuel gas adjusting valve controlled by a flow rate controller in a gas supply controller.
Figure 2B:
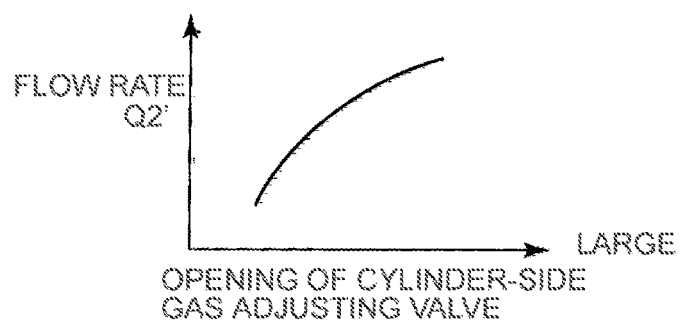
FIG. 2B is a chart illustrating an exemplary relationship between a flow rate and an opening of a second fuel gas adjusting valve controlled by a flow rate controller in the gas supply controller.

Next, in step S4, the fuel gas flow rate Q2' in each of the gas supply branch pipes 39 is calculated from the opening of each of the cylinder-side gas adjusting valves 45 of step S3. When calculating the fuel gas flow rate Q2', the fuel gas flow rate Q2' is calculated based on a characteristic relation illustrated in FIG. 2B between the flow rate and the valve opening of the second controller 67 in the gas supply controller 63. The fuel gas flow rate Q2 is calculated as a sum of the fuel gas flow rates Q2' of the fuel gas flowing in the gas supply branch pipes 39 for all of the cylinders, and the fuel gas of the fuel gas flow rate Q2 is supplied by the cylinder-side gas supply pipe 37.

Next, in step S5, the fuel gas flow rate Q1 in the supercharger-side gas supply pipe 33 is calculated according to a constant ratio value (e.g. a value smaller than one) which is set in the flow rate ratio maintaining unit 65 for maintaining a flow rate ratio Q1/Q2 at a constant value.

Next, in step S6, the opening of the supercharger-side gas adjusting valve 43 is calculated from the fuel gas flow rate Q1 in the supercharger-side gas supply pipe 33. Then, in step S7, based on the calculated opening, the opening of the supercharger-side gas adjusting valve 43 is adjusted.

In step S8, it is determined whether or not the output of the generator 9 is kept constant based on the detection value from the rotation speed sensor 55 or the load detector 57. In the case where the output of the generator is not kept constant, the process returns to step S3 to repeat the steps from the opening adjustment of each of the cylinder-side gas adjusting valves 45.

In the case where it is determined in step S8 that the output of the generator 9 is kept constant, the process is ended. And at the same time, step S9 is performed. In step S9, in the case where the electric power output is kept constant, it is determined that the flow rate Q3 at the outlet of the supercharger is kept constant and the opening control of the exhaust bypass valve 27 is not performed. In the case where the outside temperature or the pressure changes, the opening of the exhaust bypass valve 27 is controlled to keep the outlet flow rate Q3 of the supercharger at a constant value so as to avoid change in the air-fuel ratio and maintain stable combustion. This control to keep the outlet flow rate Q3 of the supercharger constant is performed based on signals from the supply air pressure sensor 59 and the supply air temperature sensor 61.

Figure 5:
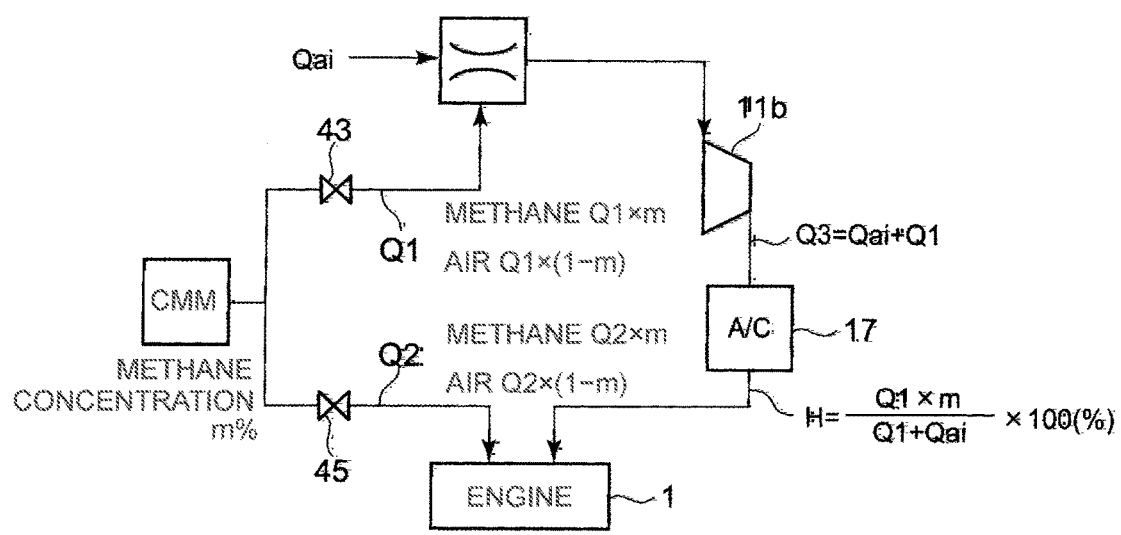
FIG. 5 is a schematic view illustrating a relationship among fuel gas flow rates, Q1, Q2, Q3 and a gas concentration H of the fuel gas in a supply air pipe.

Based on the relationship among the fuel gas flow rates Q1, Q2, Q3, Q4, the fuel gas concentration H in the supply air pipe 15 is described in reference to a schematic figure of FIG. 5. The supply air pipe 15 connects the mixer 31 to the compressor 11b, and also connects the supply-air outlet of the compressor 11b to each of the supply air branch pipes 13.

In the fuel gas flow rate Q1 from the supercharger-side gas supply pipe 33, when the methane concentration is m %, a methane flow rate is Q1×n and the air flow rate is Q1×(1−m). Similarly, in the fuel gas flow rate Q2 from the cylinder-side gas supply pipe 37, when the methane concentration is m %, a methane flow rate is Q2×n and the air flow rate is Q2×(1−m).

In the flow rate Q3 on a downstream side of the compressor 11b, Q3=Qai+Q1. Further, the fuel gas concentration H on the downstream side of the compressor 11b is expressed as H=(Q1×m)/(Q1+Qai).

Herein, the electric power output of the generator 9 is constant (constant load) under the condition the calorie value based on the methane flow rate is constant, and thus (Q1+Q2)×m=constant value=K1 (change in efficiency (output) relative to change in methane gas concentration is so small and thus is set as a constant value).

Further, in the case where the gas flow rate at the outlet of the compressor 11b is constant, Q3=Qai+Q1=constant value=K2.

Furthermore, Q1/Q2=constant value=K3, which is one characteristic of the present invention.

Based on K1, K2 and K3, the equation of the fuel gas concentration H on the downstream side of the compressor 11b, H=(Q1×m)/(Q1+Qai) is rewritten as described in equation (1) below.

$$H = (Q1 \times m)/(Q1 + Q_{ai}) \quad (1)$$
$$= (Q1 \times m)/(Q1 + Q3 - Q1)$$
$$= (Q1/Q3) \times m$$
$$= (Q1 \times m)/Q3$$
$$= (K1/(1 + K3)) \times 1/K2$$

Figure 6A:
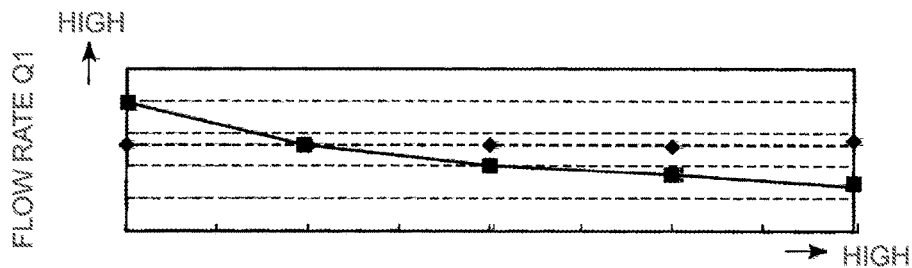
FIG. 6A is a graph showing the flow rate Q1 compared to that of a comparison example.
Figure 6B:
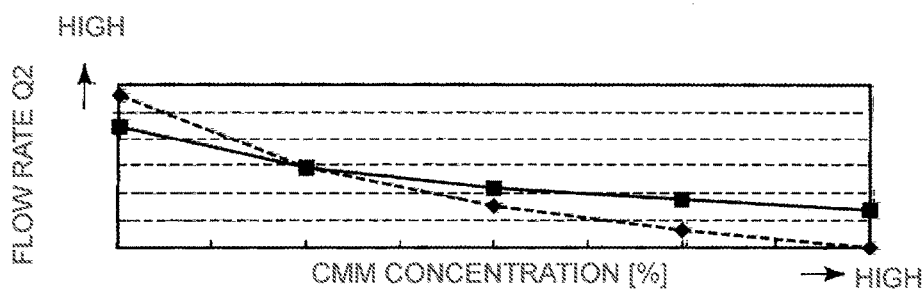
FIG. 6B is a graph showing the flow rate Q2 compared to that of the comparison example.
Figure 6C:
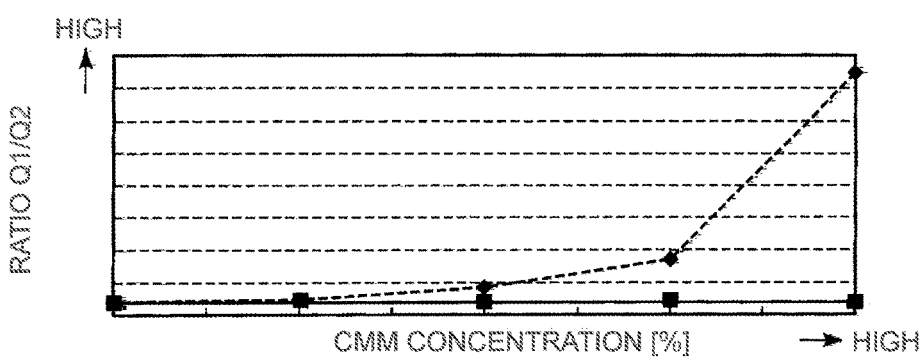
FIG. 6C is a graph showing a flow rate ratio Q1/Q2 compared to that of the comparison example.
Figure 6D:
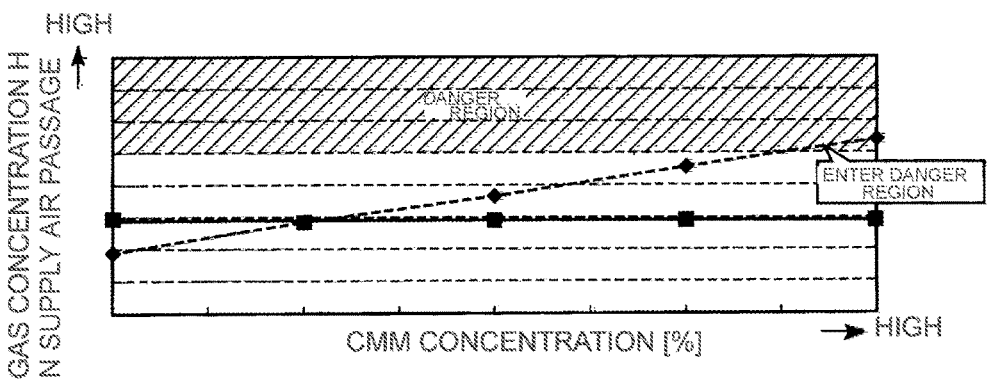
FIG. 6D is a graph showing the gas concentration in a supply air passage compared to that of the comparison example.

Therefore, it is shown that the fuel gas concentration H on the downstream side of the compressor 11b is constant. Further, results of confirmation tests are explained in reference to FIG. 6A to FIG. 6D. In FIG. 6A to FIG. 6D, the horizontal axis indicates methane concentration of CMM supplied as the fuel gas. The vertical axis in FIG. 6A is the flow rate Q1. The vertical axis in FIG. 6B is the flow rate Q2. The vertical axis in FIG. 6C is the ratio Q1/Q2. The vertical axis in FIG. 6D is the gas concentration in the supply air pipe.

In a comparison example, the flow rate Q1 on an upstream side of the supercharger is controlled to be constant and the results are indicated by dotted lines in FIG. 6A to FIG. 6D. In the case of this comparison example, the flow rate Q1 is constant and thus when the methane concentration of the fuel gas increases, the flow rate Q2 is reduced to keep the engine output constant, whereas the flow rate Q1 is kept constant. As a result, the flow rate ratio Q1/Q2 increases significantly as illustrated in FIG. 6C and the methane concentration in the flow rate Q1 increases, thereby raising the methane concentration in the supply air pipe. As illustrated in FIG. 8D, there is a risk of the methane concentration increasing to a region of danger such as explosion caused by self ignition of methane.

In this embodiment, when the methane concentration of the fuel gas increases, the flow rate Q2 is reduced to keep the output of the engine constant (FIG. 6B) and then, the flow rate Q1 is reduced (FIG. 6A) according to the constant flow rate ratio (FIG. 6C).

In this manner, with the constant ratio Q1/Q2 and the constant output control, the fuel gas concentration H on the downstream side of the compressor 11b becomes constant (FIG. 6D) as shown in equation (1). As a result, it is possible to surely prevent the methane concentration in the supply air pipe from increasing to the region of danger such as explosion caused by self ignition of methane.

In this manner, with the simple control of controlling the fuel gas flow rate Q1 in the supercharger-side gas supply pipe 33 and the fuel gas flow rate Q2 in the cylinder-side gas supply pipe 37, it is possible to prevent the concentration of the fuel gas introduced into the supply air pipe 15 from the supercharger-side gas supply pipe 33 from increasing to the level that causes abnormal combustion such as explosion and ignition in the supply air pipe and. As a result, the safety of the engine is improved.

In contrast, when the concentration of the fuel gas decreases, the flow rate Q2 is increased to keep the output of the engine constant and the flow rate Q1 is increased based on to the constant flow rate ratio. This has an effect to suppress decline of the gas concentration of the mixture fuel gas which is mixed by the mixer and then introduced to the compressor 11b of the supercharger 11 so as to keep the gas concentration approximately at a constant value. Further, this also has an effect of reaching a constant output immediately by increasing the fuel gas flow rate Q2 to keep the output of the engine constant and increasing the fuel gas flow rate Q1 based on the constant flow rate ratio.

According to the present invention, it is possible in the low-calorie fuel gas whose calorific value tends to fluctuate, to achieve safety by controlling the fuel gas flow rate so that abnormal combustion such as self-ignition and explosion of the fuel gas in the supply air passage including the outlet of the supercharger is prevented surely and easily. Therefore, it is suitable for use in the fuel gas supply method and the fuel gas supply unit for the gas engine.

The invention claimed is:

1. A fuel gas supply method for a gas engine which comprises: a fuel gas passage for supplying fuel gas which has low calorie and which fluctuates, the fuel gas passage branching into a supercharger-side gas supply passage which is connected to a mixer arranged on an air inlet side of a supercharger and a cylinder-side gas supply passage which is connected to a supply air passage for supplying air to an cylinder and on which a gas compressor for compressing the fuel gas is disposed; a first fuel gas adjusting valve for controlling a flow rate of the fuel gas in the supercharger-side gas supply passage; and a second fuel gas adjusting valve for controlling a flow rate of the fuel gas in the cylinder-side gas supply passage, the method comprising the steps of:

maintaining a flow rate ratio Q1/Q2 at a constant value where Q1 is a fuel gas flow rate in the supercharger-side gas supply passage which is adjustable by the first fuel gas adjusting valve and Q2 is a fuel gas flow rate in the cylinder-side gas supply passage which is adjustable by the second fuel gas adjusting valve;

adjusting the fuel gas flow rate Q2, when a gas concentration of the fuel gas changes, by adjusting the second fuel gas adjusting valve so as to keep an output of the gas engine constant;

determining an adjusted fuel gas flow rate Q1 based on the constant flow rate ratio Q1/Q2 and the adjusted fuel gas flow rate Q2; and adjusting the first fuel gas adjusting valve by the determined adjusted fuel gas flow rate Q1, wherein, when the gas concentration of the fuel gas increases, the fuel gas flow rate Q2 is reduced to keep the output of the gas engine constant and the fuel gas flow rate Q1 is reduced based on the constant flow rate ratio Q1/Q2 so that rise in the gas concentration of the fuel gas introduced to the supercharger after being mixed in the mixer is suppressed to maintain the gas concentration approximately at a constant value.

2. The fuel gas supply method according to claim 1, wherein the gas concentration which is maintained approximately at the constant value is a prescribed value below a flammable lower limit of the fuel gas with respect to the air.

3. The fuel gas supply method according to claim 1, wherein the gas engine is an engine for electric power generation and is configured so that electric power output of the gas engine is kept constant by keeping the output of the gas engine constant.

4. The fuel gas supply method according to claim 1, wherein the fuel gas is coal mine methane having a low calorific value that easily fluctuates.

5. The fuel gas supply method according to claim 1, further comprising:

determining the adjusted fuel gas flow rate Q2 from an opening of the second fuel gas adjusting valve which is adjusted to keep an output of the gas engine constant;

determining an opening of the first fuel gas adjusting valve from the adjusted fuel gas flow rate Q1 calculated based on the constant flow rate ratio Q1/Q2 and the adjusted fuel gas flow rate Q2; and adjusting the opening of the first fuel gas adjusting valve based on the determined opening of the first fuel gas adjusting valve.

6. The fuel gas supply method according to claim 5, wherein:

the fuel gas flow rate Q2 and the opening of the first fuel gas adjusting valve are determined based on a characteristic relation between a flow rate and a valve opening of the first fuel gas adjusting valve and a flow rate and a valve opening of the second fuel gas adjusting valve.

7. A fuel gas supply method for a gas engine which comprises: a fuel gas passage for supplying fuel gas which has low calorie and which fluctuates, the fuel gas passage branching into a supercharger-side gas supply passage which is connected to a mixer arranged on an air inlet side of a supercharger and a cylinder-side gas supply passage which is connected to a supply air passage for supplying air to an cylinder and on which a gas compressor for compressing the fuel gas is disposed; a first fuel gas adjusting valve for controlling a flow rate of the fuel gas in the supercharger-side gas supply passage; and a second fuel gas adjusting valve for controlling a flow rate of the fuel gas in the cylinder-side gas supply passage, the method comprising the steps of:

maintaining a flow rate ratio Q1/Q2 at a constant value where Q1 is a fuel gas flow rate in the supercharger-side gas supply passage which is adjustable by the first fuel gas adjusting valve and Q2 is a fuel gas flow rate in the cylinder-side gas supply passage which is adjustable by the second fuel gas adjusting valve;

adjusting the fuel gas flow rate Q2, when a gas concentration of the fuel gas changes, by adjusting the second fuel gas adjusting valve so as to keep an output of the gas engine constant;

determining an adjusted fuel gas flow rate Q1 based on the constant flow rate ratio Q1/Q2 and the adjusted fuel gas flow rate Q2; and adjusting the first fuel gas adjusting valve by the determined adjusted fuel gas flow rate Q1, wherein, when gas concentration of the fuel gas decreases, the fuel gas flow rate Q2 is increased to keep the output of the gas engine constant and the fuel gas flow rate Q1 is increased based on the constant flow rate ratio Q1/Q2 so that decline in the gas concentration of the fuel gas introduced to the supercharger after being mixed in the mixer is suppressed to maintain the gas concentration approximately at a constant value.

8. The fuel gas supply method according to claim 7, wherein the gas concentration which is maintained approximately at the constant value is a prescribed value below a flammable lower limit of the fuel gas with respect to the air.

9. A fuel gas supply apparatus for a gas engine, the apparatus comprising:
   a fuel gas passage for supplying fuel gas which has low calorie and which fluctuates, the fuel gas passage branching into: a supercharger-side gas supply passage connected to a mixer arranged on an air inlet side of a supercharger; and a cylinder-side gas supply passage which is connected to a supply air passage for supplying air to a cylinder and on which a gas compressor for compressing the fuel gas is disposed;
   a first fuel gas adjusting valve to control a flow rate of the fuel gas in the supercharger-side gas supply passage;
   a second fuel gas adjusting valve to control a flow rate of the fuel gas in the cylinder-side gas supply passage; and
   a gas supply controller to control an opening of the first fuel gas adjusting valve and an opening of the second fuel gas adjusting valve,
   wherein the gas supply controller comprises:
      a flow rate ratio maintaining unit configured to maintain a flow rate ratio Q1/Q2 at a constant value where Q1>0, and where Q1 is a fuel gas flow rate in the supercharger-side gas supply passage which is adjustable by the first fuel gas adjusting valve and Q2 is a fuel gas flow rate in the cylinder-side gas supply passage which is adjustable by the second fuel gas adjusting valve;
      a second controller to control the second fuel adjusting valve, the second controller being configured to adjust the fuel gas flow rate Q2 by controlling the second fuel adjusting valve so as to keep an output of the gas engine constant when a gas concentration of the fuel gas changes; and
      a first controller to control the first fuel adjusting valve, the first controller being configured to, after the fuel gas flow rate Q2 is adjusted by the second controller, determine an adjusted fuel gas flow rate Q1 based on the constant flow rate ratio Q1/Q2 and the adjusted fuel gas flow rate Q2, and adjust an opening of the first fuel gas adjusting valve based on the determined adjusted fuel gas flow rate Q1.

10. The fuel gas supply apparatus according to claim 9, wherein the second controller for controlling the second fuel adjusting valve is further configured to determine the adjusted fuel gas flow rate Q2 from an opening of the second fuel gas adjusting valve which is adjusted to keep an output of the gas engine constant,
   wherein the first controller for controlling the first fuel adjusting valve is further configured to:
      determine an opening of the first fuel gas adjusting valve from the adjusted fuel gas flow rate Q1 determined based on the constant flow rate ratio Q1/Q2 and the adjusted fuel gas flow rate Q2; and
      adjust the opening of the first fuel gas adjusting valve based on the determined opening of the first fuel gas adjusting valve.

11. The fuel gas supply apparatus according to claim 10, wherein:
   the fuel gas flow rate Q2 and the opening of the first fuel gas adjusting valve are determined based on a characteristic relation between a flow rate and a valve opening of the first fuel gas adjusting valve, and a flow rate and a valve opening of the second fuel gas adjusting valve.

* * * * *